United States Patent
Kim

(10) Patent No.: US 11,007,754 B2
(45) Date of Patent: May 18, 2021

(54) FILM AND HIDDEN SWITCH STRUCTURE HAVING THE SAME

(71) Applicants: SEOYON E-HWA CO., LTD., Seoul (KR); SEOYON AMERICA CORPORATION, Auburn Hills, MI (US)

(72) Inventor: Ki Ho Kim, Chungcheongnam-do (KR)

(73) Assignees: SEOYON E-HWA CO., LTD.; SEOYON AMERICA CORPORATION, Auburn Hills, MI (US)

( * ) Notice: Subject to any disclaimer, the term of this patent is extended or adjusted under 35 U.S.C. 154(b) by 0 days.

(21) Appl. No.: 16/664,127

(22) Filed: Oct. 25, 2019

(65) Prior Publication Data
US 2020/0130330 A1    Apr. 30, 2020

(30) Foreign Application Priority Data
Oct. 29, 2018    (KR) .................. 10-2018-0129994

(51) Int. Cl.
*B32B 21/04* (2006.01)
*B32B 3/26* (2006.01)
(Continued)

(52) U.S. Cl.
CPC .............. *B32B 21/04* (2013.01); *B32B 3/263* (2013.01); *B32B 3/266* (2013.01); *B32B 5/022* (2013.01); *B32B 7/12* (2013.01); *B32B 21/10* (2013.01); *H05K 5/0017* (2013.01); *B32B 2255/00* (2013.01); *B32B 2307/412* (2013.01); *B32B 2457/00* (2013.01); *B32B 2605/08* (2013.01);
(Continued)

(58) Field of Classification Search
CPC ........... B32B 21/04; B32B 7/12; B32B 21/10; B32B 3/263
USPC .................................................. 200/5 A, 512
See application file for complete search history.

(56) References Cited

U.S. PATENT DOCUMENTS

| | | | |
|---|---|---|---|
| 2006/0209048 A1* | 9/2006 | Matsumoto | G06F 3/045 345/173 |
| 2011/0094868 A1* | 4/2011 | Lamers | H01H 13/705 200/5 A |

(Continued)

FOREIGN PATENT DOCUMENTS

| | | | | |
|---|---|---|---|---|
| KR | 100913811 | * | 8/2009 | ............. B32B 21/14 |
| KR | 100913811 B1 | | 8/2009 | |

*Primary Examiner* — Edwin A. Leon
*Assistant Examiner* — Iman Malakooti
(74) *Attorney, Agent, or Firm* — Tarolli, Sundheim, Covell & Tummino LLP

(57) ABSTRACT

Disclosed herein are a film and a hidden switch structure having the same. The film includes a base layer made of a transparent material, a first adhesive layer laminated on the base layer, a shield layer laminated and bonded on the first adhesive layer and having a symbol laser-machined after an opaque paint is applied to the shield layer, a second adhesive layer laminated on the shield layer, and a sheet layer laminated on the second adhesive layer and made of thin real wood, thereby enhancing visibility. The hidden switch structure includes a first substrate having LEDs, a second substrate spaced apart from the first substrate and having a touch sensor, a molded article having a built-in prism and laminated on the second substrate, and the film, thereby increasing a degree of freedom of design and enhancing aesthetics.

6 Claims, 4 Drawing Sheets

(51) Int. Cl.
*B32B 5/02* (2006.01)
*B32B 7/12* (2006.01)
*B32B 21/10* (2006.01)
*H05K 5/00* (2006.01)
*B60K 37/06* (2006.01)

(52) U.S. Cl.
CPC ...... *B60K 37/06* (2013.01); *B60K 2370/1446* (2019.05)

(56) References Cited

U.S. PATENT DOCUMENTS

2012/0228106 A1\* 9/2012 Horino .................... G06F 3/044
                                                        200/5 A
2017/0227183 A1\* 8/2017 Cho ........................ F21S 41/32

\* cited by examiner

[FIG. 6A]
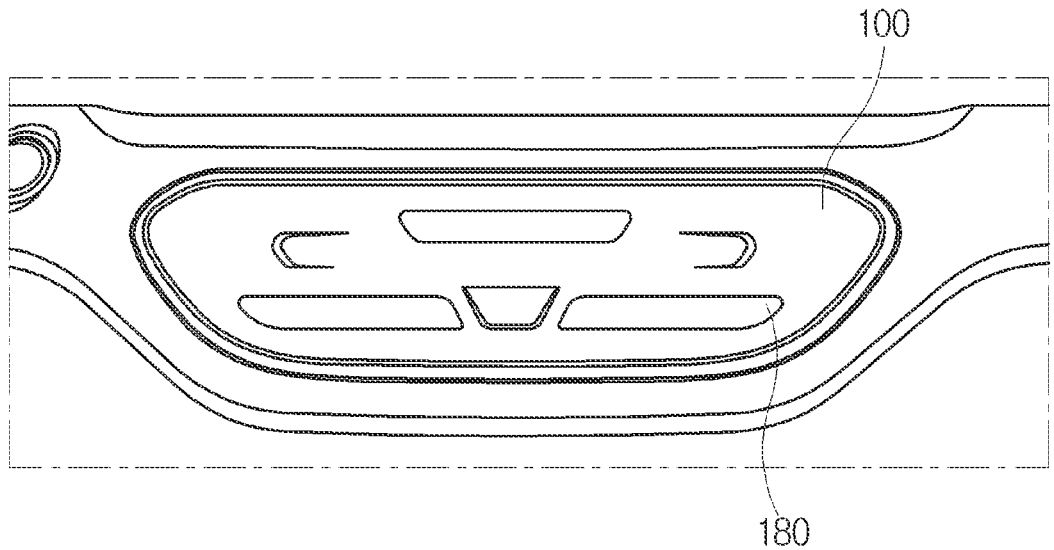
[FIG. 6B]
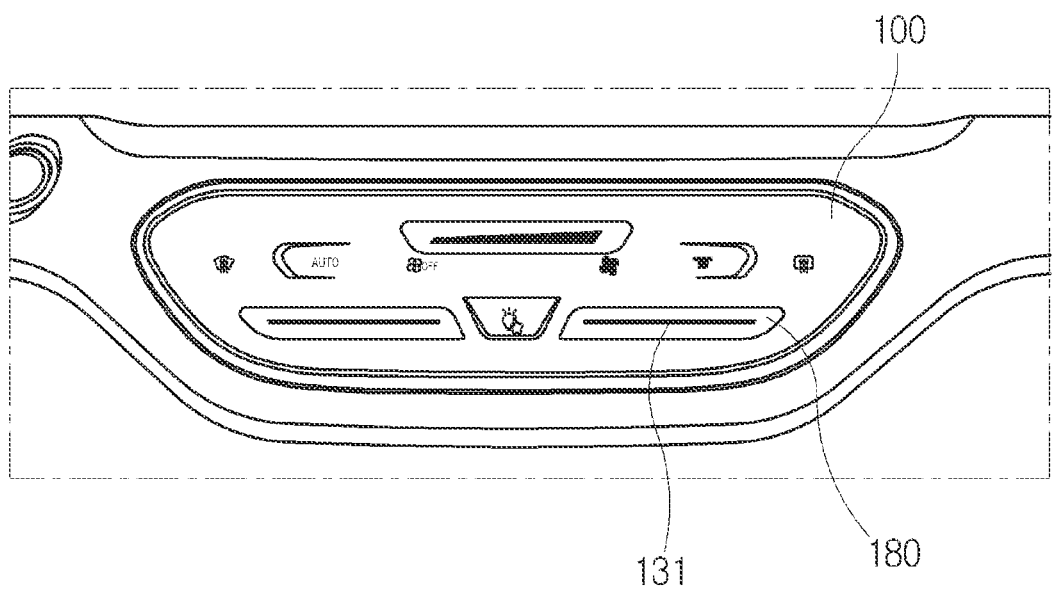

FILM AND HIDDEN SWITCH STRUCTURE HAVING THE SAME

CROSS-REFERENCE TO RELATED APPLICATION

This application claims priority to Korean Patent Application No. 10-2018-0129994, filed on Oct. 29, 2018, the disclosure of which is incorporated herein by reference in its entirety.

BACKGROUND OF THE INVENTION

Field of the Invention

Exemplary embodiments of the present disclosure relate to a film and a hidden switch structure having the same, and more particularly, to a film capable of increasing a degree of freedom of design in a vehicle to enhance aesthetics and of providing a more luxurious and differentiated design by applying a real wood film as the film to meet consumers' demand, and a hidden switch structure having the same.

Description of the Related Art

In general, a vehicle is equipped with interior materials that are disposed in a crash pad positioned in the front of driver and passenger seats, door trims, panels around a dashboard assembled to the crash pad, a center fascia panel (where a stereo system, a cup holder, an ashtray, etc. are mounted), a head lining (ceiling material), and the like.

The vehicle is also equipped with exterior materials/garnishes disposed on side doors, a tailgate, and the like, and the exterior and interior materials are made of different materials.

For the vehicle interior and exterior materials, especially for the vehicle interior materials, consumers desire sophistication and high-quality texture in appearance.

For this reason, natural/real materials, such as real wood, real aluminum, carbon fabric, and mother-of-pearl, are used as decoration materials for existing vehicle interior parts.

Among them, the other materials except for the real aluminum realize a sense of depth in products and image clarity in appearance by applying PUR casting (polyurethane reaction injection) thereto.

For example, Korean Patent No. 913811 discloses a technology on an interior material to which a real wood film is applied, and a method for manufacturing the same.

However, as the real wood film is applied to the curved portion in the vehicle, a stress is concentrated on the edge portion that is bent and deformed, which may lead to considerable deterioration in surface quality due to continuous occurrence of brittleness and breakage.

In addition, consumers demand an interior environment with interior materials of more luxurious and differentiated new design in a vehicle. In particular, there is insufficient to meet the demand for improvement in consumers' aesthetics of switch modules such as a center fascia.

RELATED ART DOCUMENT

[Patent Document]
(Patent Document 0001) Korean Patent No. 913811

SUMMARY OF THE INVENTION

It is an object of the present disclosure to provide a film capable of increasing a degree of freedom of design in a vehicle to enhance aesthetics by providing a switch module in a touch manner, and in particular, by displaying a symbol of the switch module according to the driver's need while the symbol of the switch module is not normally exposed, and a hidden switch structure having the same.

It is another object of the present disclosure to provide a film capable of providing a more luxurious and differentiated design by applying a real wood film as the film to meet consumers' demand, and in particular, by providing a real wood film with high visibility so that a driver recognizes a symbol with more accuracy, and a hidden switch structure having the same.

It is a further object of the present disclosure to provide a film capable of providing convenience for a driver such that the driver senses a symbol position tactually, and a hidden switch structure having the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided a film that includes a base layer made of a transparent material, a first adhesive layer laminated on the base layer to which an adhesive is applied, a shield layer laminated and bonded on the first adhesive layer and having a symbol laser-machined after an opaque paint is applied to the shield layer, a second adhesive layer laminated on the shield layer to which an adhesive is applied, and a sheet layer laminated on the second adhesive layer and made of thin real wood.

Each of the second adhesive layer and the sheet layer may include a plurality of light-transmission enhancement holes formed at a position corresponding to the symbol while each having a diameter dimension of microunits.

The film may further include a nonwoven layer laminated and bonded between the shield layer and the second adhesive layer to prevent the sheet layer from breaking.

Each of the nonwoven layer, the second adhesive layer, and the sheet layer may include a plurality of light-transmission enhancement holes formed at a position corresponding to the symbol while each having a diameter dimension of microunits.

In accordance with another aspect of the present disclosure, there is provided a hidden switch structure that includes a first substrate having a plurality of LEDs installed thereon, a second substrate spaced apart from the first substrate and having a touch sensor installed thereon, a molded article having a built-in prism at a position corresponding to the LEDs, the molded article being formed by injection molding and being laminated on the second substrate, and a film disposed on the molded article, wherein the film includes a base layer made of a transparent material, a first adhesive layer laminated on the base layer to which an adhesive is applied, a shield layer laminated and bonded on the first adhesive layer and having a symbol laser-machined after an opaque paint is applied to the shield layer, a second adhesive layer laminated on the shield layer to which an adhesive is applied, and a sheet layer laminated on the second adhesive layer and made of thin real wood.

The film may further include a touch part bent downwardly in a concave shape at a position corresponding to the LEDs.

The molded article and the prism may include a single recess recessed from their surfaces, on which the film is installed, so as to correspond to the shape of the touch part so that the touch part is seated on the recess.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIGS. 6A and 6B are photographs illustrating an example in which the hidden switch structure including the film according to the embodiments of the present disclosure is applied to a vehicle.

DESCRIPTION OF SPECIFIC EMBODIMENTS

Figure 1:
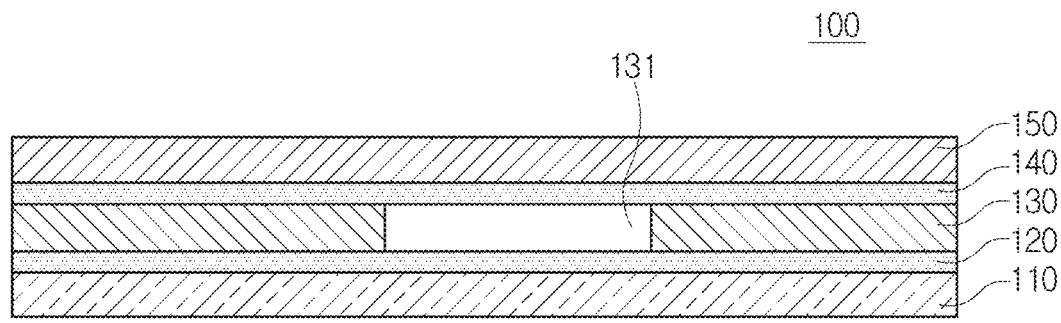
FIG. 1 is a cross-sectional view illustrating a film according to an embodiment of the present disclosure.

Exemplary embodiments of the present disclosure will be described below in more detail with reference to the accompanying drawings. It should be noted that reference numerals are added to the components of the accompanying drawings to facilitate understanding of the embodiments described below and the same reference numbers will be used throughout the drawings to refer to the same or like parts wherever possible. In certain embodiments, detailed descriptions of constructions or functions well known in the art may be omitted to avoid obscuring appreciation of the disclosure by a person of ordinary skill in the art.

Figure 2:
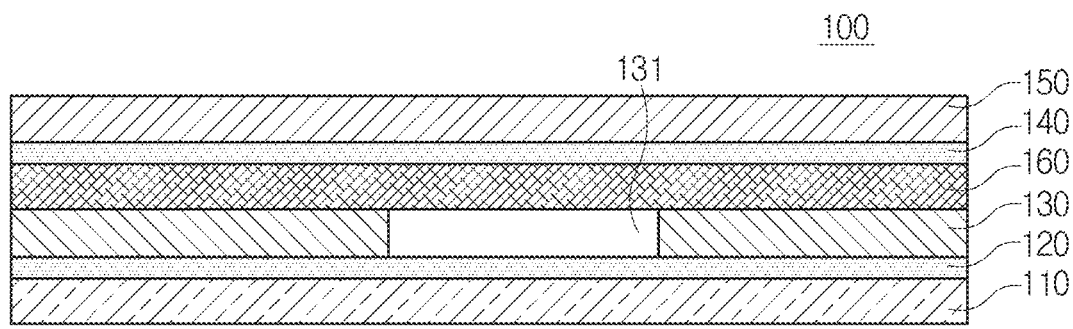
FIG. 2 is a cross-sectional view illustrating a film according to another embodiment of the present disclosure.
Figure 3:
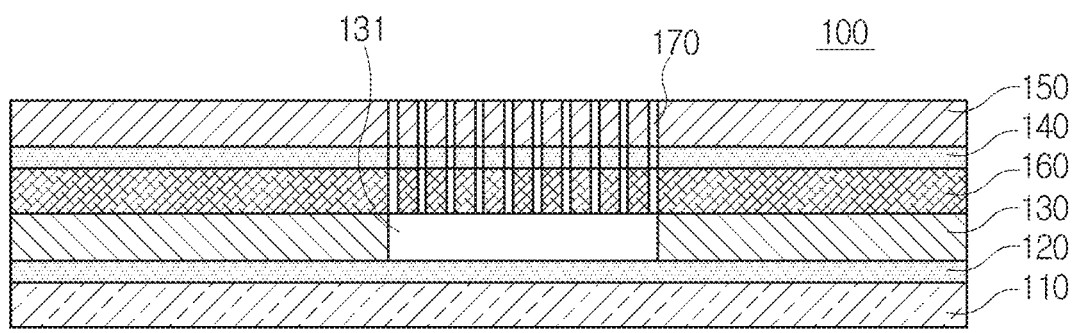
FIG. 3 is a cross-sectional view illustrating a film according to a further embodiment of the present disclosure.
Figure 4:
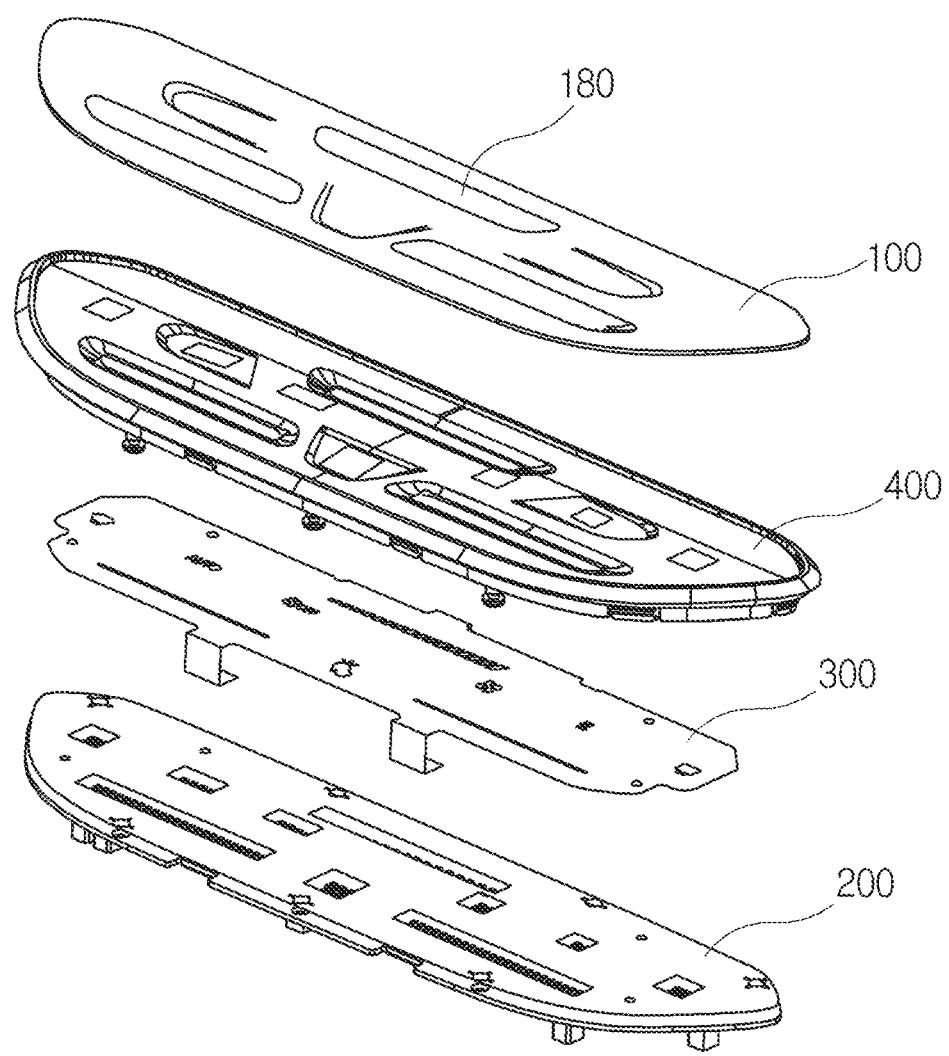
FIG. 4 is a top view illustrating a hidden switch structure including the film according to the embodiments of the present disclosure.
Figure 5:
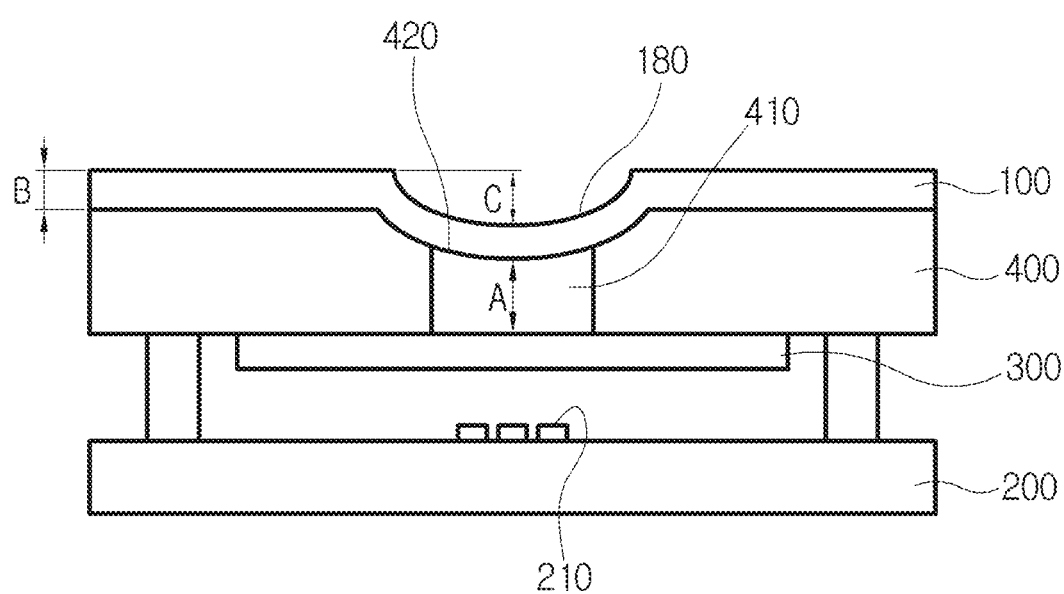
FIG. 5 is a cross-sectional view illustrating the hidden switch structure including the film according to the embodiments of the present disclosure.

FIG. 1 is a cross-sectional view illustrating a film according to an embodiment of the present disclosure. FIG. 2 is a cross-sectional view illustrating a film according to another embodiment of the present disclosure. FIG. 3 is a cross-sectional view illustrating a film according to a further embodiment of the present disclosure. FIG. 4 is a top view illustrating a hidden switch structure including the film according to the embodiments of the present disclosure. FIG. 5 is a cross-sectional view illustrating the hidden switch structure including the film according to the embodiments of the present disclosure. FIGS. 6A and 6B are photographs illustrating an example in which the hidden switch structure including the film according to the embodiments of the present disclosure is applied to a vehicle.

As illustrated in FIGS. 1 to 3, the film, which is designated by reference numeral 100, according to the embodiments of the present disclosure includes a base layer 110 made of a transparent material, a first adhesive layer 120 laminated on the base layer 110 to which an adhesive is applied, a shield layer 130 laminated and bonded on the first adhesive layer 120 and having a symbol 131 laser-machined after an opaque paint is applied to the shield layer 130, a second adhesive layer 140 laminated on the shield layer 130 to which an adhesive is applied, and a sheet layer 150 laminated on the second adhesive layer 140 and made of thin real wood.

As illustrated in FIGS. 4 to 6A and 6B, the hidden switch structure including the film 100 according to the embodiments of the present disclosure includes a first substrate 200 having LEDs 210 installed thereon, a second substrate 300 spaced apart from the first substrate 200 and having a touch sensor installed thereon, a molded article 400 having a built-in prism 410 and laminated on the second substrate 300 by injection molding, and the above-mentioned film 100.

As illustrated in FIG. 1, the film 100 according to the present disclosure is a real wood film 100, and is provided as a plate-shaped unit including a base layer 110, a first adhesive layer 120, a shield layer 130, a second adhesive layer 140, and a sheet layer 150.

However, the film 100 may also be made of a variety of materials, such as insert film, fabric/leather for clothing, and real cork, in addition to real wood.

The base layer 110 is provided to increase the stiffness of the film 100 by forming the thickness of the film 100 while transmitting light from the LEDs 210. The base layer 110 is made of a plastic material.

The base layer 110 is made of, for example, an engineering plastic material, such as polyacetal (POM), polyamide (PA), polycarbonate (PC), polyimide (PI), polybutylene terephthalate (PBT), or polyethylene terephthalate (PET), to transmit light from the LEDs 210.

Particularly, the polyethylene terephthalate (PET) is one of thermoplastic plastic materials, and is excellent in strength, heat resistance, weather resistance, chemical resistance, and the like. Therefore, the polyethylene terephthalate (PET) may be provided as the material of the base layer 110 to increase the stiffness of the film 100.

The first adhesive layer 120 is laminated on the base layer 110, to which an adhesive is applied, and bonds the base layer 110 to the shield layer 130 which will be described later.

The shield layer 130 is made of the same transparent material as the base layer 110, and is laminated and bonded on the first adhesive layer 120.

The shield layer 130 is provided with the symbol 131 formed by laser machining so as to correspond to the design of the center fascia of the vehicle.

That is, the symbol 131 is provided in the shield layer 130 by cutting and removing the pattern corresponding to the symbol 131 with a laser after an opaque paint is applied to the shield layer 130.

Alternatively, the symbol 131 may be printed on the shield layer 130.

When the LEDs 210 emit light, the symbol 131 is displayed on the surface of the film 100 as the light from the LEDs 210 is transmitted through a portion on which the symbol 131 is printed.

In order to make the symbol 131 of the shield layer 130 clearer, a symbol 131 corresponding to the symbol 131 of the shield layer 130 may also be printed on the base layer 110 and a nonwoven layer 160, which will be described later, to increase visibility.

The symbol 131 may be, for example, a button such as for indoor light brightness control, indoor heater or air conditioner ON/OFF control, wind direction and speed control and automatic control, wind ON/OFF control for defrosting, outside air inflow control, or inside air circulation control.

The second adhesive layer 140 is laminated on the shield layer 130, to which an adhesive is applied, and bonds the shield layer 130 to the sheet layer 150 which will be described later.

In this case, the first and second adhesive layers 120 and 140 may each be made of one selected from the group consisting of polyvinyl acetate, phenol, melamine, urea, polyurethane, especially thermoplastic polyurethane, polyamide, ethylene-vinyl acetate, epoxy, polyester, polyvinyl alcohol, acrylonitrile-butadiene rubber, styrene-butadiene rubber, alkyd, acetylcellulose, and nitrocellulose.

The sheet layer 150 is laminated on the second adhesive layer 140 and is made of thin real wood.

Particularly, since the sheet layer 150 is made of thin real wood having a predetermined thickness obtained by cutting natural wood, there is a need for a structure for preventing damage such as breakage of real wood.

Accordingly, as illustrated in FIG. 2, the film 100 further includes a nonwoven layer 160 laminated and bonded between the shield layer 130 and the second adhesive layer 140 to prevent the breakage of the thin sheet layer 150.

The sheet layer 150 is provided in a thin-film form, and the nonwoven layer 160 is provided between the shield layer 130 and the second adhesive layer 140 to prevent the sheet layer 150 from breaking with slight shaking or impact when the sheet layer 150 is laminated on the second adhesive layer 140.

In addition, the nonwoven layer 160 prevents bubbles or wrinkles from occurring in the sheet layer 150 when the sheet layer 150 is laminated on the second adhesive layer 140.

The nonwoven layer 160 may be made of at least one composition selected from the group consisting of glass fiber, carbon fiber, polyester fiber, polyamide fiber, polyurethane fiber, acrylic fiber, polyolefin fiber, polyethylene terephthalate fiber, cellulose fiber, and pulp.

Meanwhile, in order to enhance the transparency of the sheet layer 150 when the sheet layer 150 is made of an opaque material or to make the symbol 131 display clearer even when the sheet layer 150 is made of a transparent material, each of the second adhesive layer 140 and the sheet layer 150 has a plurality of light-transmission enhancement holes 170 formed at a position corresponding to the symbol 131 and each having a diameter dimension of microunits.

In addition, the nonwoven layer 160 has a plurality of light-transmission enhancement holes 170 formed at a position corresponding to the symbol 131 and each having a diameter dimension of microunits. The light-transmission enhancement holes 170 of the nonwoven layer 160 are provided at positions corresponding to the light-transmission enhancement holes 170 of the second adhesive layer 140.

These light-transmission enhancement holes 170 are formed through the nonwoven layer 160, the second adhesive layer 140, and the sheet layer 150. The light-transmission enhancement holes 170 are invisible on the surface of the film 100 when the LEDs 210 are turned off. It is preferable that each of the light-transmission enhancement holes 170 has a diameter of 0.1 mm to 0.2 mm to transmit light well when the LEDs 210 are turned on.

That is, the light-transmission enhancement holes 170 are provided in the nonwoven layer 160, the second adhesive layer 140, and the sheet layer 150, so that when light is emitted from the lower portion of the base layer 11, the shape of the symbol 131 is exposed to the outside by the light transmitted through the light-transmission enhancement holes 170.

Thus, since the light transmitted through the shield layer 130 from the LEDs 210 passes through the light-transmission enhancement holes 170 without passing through the nonwoven layer 160, the second adhesive layer 140, and the sheet layer 150, it is possible to increase visibility and provide the driver with the clearer symbol 131.

FIGS. 4 to 6A and 6B illustrate the hidden switch structure including the film 100.

As illustrated in the drawings, the hidden switch structure includes the first substrate 100, the second substrate 300, the molded article 400, and the film 100.

In the hidden switch structure including the film 100, the symbol 131 is not displayed on the film 100 in an inactive state in which no switch is normally used.

In an active state in which the switch is used according to the driver's need, the symbol 131 is displayed on the film 100, thereby increasing the degree of freedom of design and enhancing the esthetics in the vehicle.

The first substrate 200 may be a PCB substrate having a plurality of LEDs 210 installed thereon at a position corresponding to the symbol 131. The first substrate 200 is seated on a structure installed in the front of the vehicle.

The second substrate 300 may be an FPCB substrate having a touch sensor installed thereon at a position corresponding to the symbol 131. The second substrate 300 is connected above the first substrate 200 while being spaced apart from the first substrate 200 to recognize whether or not the driver touches the symbol 131.

The molded article 400 has a built-in prism 410 at a position corresponding to the LEDs 210. The molded article 400 is laminated at a predetermined thickness on the second substrate 300 by injection molding to maintain the sensitivity of the touch sensor and make the light from the LEDs 210 appear clear.

Particularly, if the thickness A of the molded article 400, which is the distance between the touch sensor of the second substrate 300 and the touch part of the film 100, exceeds 50 mm, the sensitivity of the touch sensor is lowered to inconvenience the driver. Therefore, it is preferable that the predetermined thickness A of the molded article 400 is at least 50 mm or less.

The prism 410 may be made of, for example, a transparent material to transmit light from the LEDs 210. The prism 410 is in contact with the touch sensor of the second substrate 300 and the film 100 to improve light transmittance and enhance visibility so that the symbol 131 is clearer.

The film 100 is provided as a thin plate-shaped unit, similar to the above-mentioned film 100, and is disposed on the molded article 400.

In this case, it is preferable that the film 100 has a thickness B of 0.8 mm to 1.2 mm.

If the thickness B of the film 100 is less than 0.8 mm, there is a difficulty of the manufacturing process itself and the film 100 may be damaged, for example, torn or broken in the manufacturing or assembling process because the film 100 is too thin. Therefore, it is preferable that the thickness B of the film 100 is at least 0.8 mm or more.

On the other hand, if the thickness B of the substrate 100 is more than 1.2 mm, the light from the LEDs 21 is weak while passing through the film 100 because the film 100 is too thick. Particularly, when the real wood sheet layer 150 of the film 100 is made of an opaque material, the sheet layer 150 does not transmit the light from the LEDs 210. Therefore, it is preferable that the thickness B of the film 100 is at least 1.2 mm or less.

In order for the driver to easily recognize the position of the symbol 131, the film 100 includes a touch part 180 bent downwardly in a concave shape at a position corresponding to the LEDs 210, with the consequence that the driver can sense the position of the symbol 131 tactually.

Particularly, it is preferable that the touch part 180 has a concave length C of 1.6 mm to 1.9 mm.

If the concave length C of the touch part 180 is less than 1.6 mm, the recognition ability of the driver's sense of touch is lowered. Hence, it is impossible to guide the driver from the peripheral portion of the symbol 131 to the position of the symbol 131 during driving, and it is inconvenient for the driver to touch the symbol 131 because the driver visually checks the position of the symbol 131. Therefore, it is preferable that the concave length C of the touch part 180 is at least 1.6 mm or more.

On the other hand, if the concave length C of the touch part 180 is more than 1.9 mm, the film 100 has a sharply bent part. Hence, there is a risk of breakage during the formation of the film 100, and the driver's sense of touch is lowered due to the sharply broken portion to inconvenience the driver. Therefore, it is preferable that the concave length C of the touch part 180 is at least 1.9 mm or more.

In this case the concave length C of the touch part 180 refers to the distance between the surface of the film 100 and the most concave portion on the surface of the film 100.

The molded article 400 and the prism 410 includes a single recess 420 recessed from their surfaces, on which the film 100 is installed, so as to correspond to the shape of the touch part 180 so that the touch part 180 is seated on the recess 420.

FIGS. 6A and 6B illustrate an example in which the hidden switch structure including the film 100 is applied to the vehicle.

FIG. 6A illustrates the normal hidden switch structure in an inactive state. FIG. 6B illustrates the hidden switch structure in an active state according to the driver's need.

Referring to FIG. 6A, in the inactive state, the LEDs 210 are turned off so that the symbol 131 is hidden. In this case, since the hidden switch structure forms a portion of the interior design of the vehicle, the interior design of the vehicle is more neat and luxurious, and is differentiated.

In addition, the hidden switch structure of the present disclosure is small in volume, light in weight, and functions to be normally deactivated, compared to the existing bulky switch structure disposed at the front middle between the driver's seat and the passenger's seat. Therefore, it is possible to install the hidden switch structure at a desired position according to the consumer's demand.

Referring to FIG. 6B, when the driver touches the surface of the film 100 as needed so that the switch structure is activated, the LEDs 210 are turned on to display the symbol 131. Therefore, the driver can touch and operate the symbol 131 with more ease using visual and tactile senses.

As is apparent from the above description, the present disclosure having the above shape and structure, it is possible to increase a degree of freedom of design in the vehicle to enhance aesthetics by providing the switch module in a touch manner, and in particular, by displaying the symbol of the switch module according to the driver's need while the symbol of the switch module is not normally exposed.

In addition, it is possible to provide a more luxurious and differentiated design by applying the real wood film as the film to meet consumers' demand, and in particular, by providing the real wood film with high visibility so that the driver recognizes the symbol with more accuracy.

Furthermore, it is possible to provide convenience for the driver such that the driver senses the position of the symbol tactually.

While the present disclosure has been described in connection with what is presently considered to be the most practical and preferred embodiments, it is to be understood that the disclosure is not limited to the embodiments. That is, within the scope of the present disclosure, all of the components may be selectively coupled to one or more of them.

While the present disclosure has been described with respect to the specific embodiments, it will be apparent to those skilled in the art that various changes and modifications may be made without departing from the spirit and scope of the disclosure as defined in the following claims. Accordingly, the embodiments disclosed in the present specification and drawings are only illustrative of the present disclosure for the purpose of facilitating the explanation and understanding of the present disclosure, and are not intended to limit the scope of the present disclosure. The scope of protection of the present disclosure is defined by the appended claims, and it should be construed that all modifications or variations derived from the meaning, scope, and equivalent concept of the claims fall within the scope of the disclosure.

What is claimed is:

1. A hidden switch structure comprising:
    a first substrate having a plurality of LEDs installed thereon;
    a second substrate spaced apart from the first substrate and having a touch sensor installed thereon;
    a molded article having a built-in prism at a position corresponding to the LEDs, the molded article being formed by injection molding and being laminated on the second substrate; and
    a film disposed on the molded article, wherein the film comprises:
    a base layer made of a transparent material;
    a first adhesive layer laminated on the base layer to which an adhesive is applied;
    a shield layer laminated and bonded on the first adhesive layer and having a symbol laser-machined after an opaque paint is applied to the shield layer;
    a second adhesive layer laminated on the shield layer to which an adhesive is applied; and
    a sheet layer laminated on the second adhesive layer and made of thin real wood.

2. The hidden switch structure according to claim 1, wherein the film further comprises a touch part bent downwardly in a concave shape at a position corresponding to the LEDs.

3. The hidden switch structure according to claim 2, wherein the molded article and the prism comprises a single recess recessed from their surfaces, on which the film is installed, so as to correspond to the shape of the touch part so that the touch part is seated on the recess.

4. The hidden switch structure according to claim 1, wherein each of the second adhesive layer and the sheet layer comprises a plurality of micro-holes formed at a position corresponding to the symbol.

5. The hidden switch structure according to claim 1, wherein the film further comprises a nonwoven layer laminated and bonded between the shield layer and the second adhesive layer to prevent the sheet layer from breaking.

6. The hidden switch structure according to claim 5, wherein the nonwoven layer comprises a plurality of micro-holes formed at a position corresponding to the symbol.

* * * * *